United States Patent [19]

Khare et al.

[11] Patent Number: 5,269,990

[45] Date of Patent: Dec. 14, 1993

[54] PREPARATION OF SHAPED ZIRCONIA PARTICLES

[75] Inventors: Gyanesh P. Khare; Hobert L. Williams, both of Bartlesville, Okla.

[73] Assignee: Phillips Petroleum Company, Bartlesville, Okla.

[21] Appl. No.: 931,087

[22] Filed: Aug. 17, 1992

[51] Int. Cl.⁵ .................. C04B 35/48; B29C 47/00; B29C 43/02
[52] U.S. Cl. .................. 264/63; 264/211.11; 501/103
[58] Field of Search .............. 501/103; 264/211.11, 264/211.12, 63, 319; 502/349; 106/204

[56] References Cited

U.S. PATENT DOCUMENTS

| | | | |
|---|---|---|---|
| 3,275,580 | 9/1966 | Battista et al. | 260/17.4 |
| 3,311,481 | 3/1967 | Sterry et al. | 106/57 |
| 4,485,182 | 11/1984 | Enomoto et al. | 264/63 |
| 4,515,904 | 5/1985 | Edwards | 502/209 |
| 4,637,995 | 1/1987 | DeAngelis et al. | 502/439 |
| 4,789,651 | 12/1989 | Sugie | 501/103 |
| 4,835,126 | 5/1989 | Wachs et al. | 502/209 |
| 4,837,193 | 6/1989 | Akizuki et al. | 502/342 |
| 4,909,973 | 5/1990 | Nishio et al. | 264/63 |
| 4,937,212 | 6/1990 | Funkenbusch et al. | 501/95 |
| 4,965,039 | 10/1990 | Schuetz | 264/211.12 |

OTHER PUBLICATIONS

Kirk-Othmer Encyclopedia of Chemical Technology, vol. 24, Third Edition, 1984, pp. 882 and 883.

*Primary Examiner*—Mark L. Bell
*Assistant Examiner*—C. M. Bonner
*Attorney, Agent, or Firm*—K. K. Brandes

[57] ABSTRACT

Shaped zirconia particles are prepared by mixing zirconia powder with an aqueous colloidal zirconia solution or an aqueous acid solution so as to obtain a shapable mixture containing about 4–40 weight-% water, shaping this mixture, and heating the shaped particles at a temperature in excess of about 90° C.

33 Claims, No Drawings

PREPARATION OF SHAPED ZIRCONIA PARTICLES

BACKGROUND OF THE INVENTION

This invention relates to the preparation of shaped zirconia particles having high strength and high surface area.

Shaped zirconia particles (e.g., tablets, pellets or extrudates) can be used as support materials in the preparation of various catalysts, such as CO oxidation catalysts (disclosed in U.S. Pat. No. 4,921,830). A requirement for the successful commercial use of such catalysts in fixed bed operations is high crush strength (so as to assure the integrity of catalyst particles, especially those at the bottom of catalyst beds, and to avoid undesirable dusting) and high surface area (so as to assure adequate exposure of the catalytically active components to the reaction medium). Since the catalytically active components are generally incorporated into the zirconia support particles by impregnation, it is frequently also important to provide shaped zirconia particles having adequate porosity. The preparation process of this invention is designed to produce shaped zirconia particles meeting the above-outlined requirements.

SUMMARY OF THE INVENTION

It is an object of this invention to prepare shaped zirconia particles having high crush strength and high surface area.

In accordance with this invention, a process for preparing shaped zirconia particles comprises the steps of (a) mixing zirconia powder with an aqueous colloidal solution of zirconia or, alternatively, an aqueous acid solution, and adjusting the water content of the obtained mixture to a level of about 5 to about 40 weight-% $H_2O$; (b) shaping the mixture obtained in step (a); and (c) heating the shaped particles obtained in step (b) at a temperature in excess of about 90° C. (preferably about 300°-750° C.).

Preferably, the zirconia powder employed in step (a) has a pore volume of about 0.2-0.5 cc/g (measured by water intrusion at atmospheric pressure), a surface area of about 20-150 $m^2/g$ (measured by the BET method using $N_2$), and a particle size of about 0.1-5 microns. Step (a) is preferably carried out as a sequence of five substeps: (a1) mixing zirconia powder with an aqueous colloidal solution of zirconia or, alternatively, an aqueous acid solution (more preferably dissolved $H_2SO_4$ or $CH_3CO_2H$); (a2) substantially drying the mixture obtained in step (a1); (a3) grinding the substantially dried mixture obtained in (a2); (a4) selecting that portion of substantially dried particles having a particle size of about 20-325 mesh; and (a5) adding enough water to obtain a mixture containing about 8-30 weight-% $H_2O$. In a preferred embodiment, a lubricating processing aid (more preferably zinc stearate or cellulose gel) is also added in step (a5), either together with water or after the water addition or before the water addition. The presently preferred shaping means in step (c) is tabletting or extrusion.

DETAILED DESCRIPTION OF THE INVENTION

Zirconia powders which can be used in step (a) of the process of this invention are commercially available (e.g., from Zirconia Sales of America, Atlanta, Ga.). Preferably, the zirconia powder used in step (a) has a particle size of about 0.1-5 microns (more preferably about 0.5-1.2 microns), a pore volume (measured by water intrusion at atmospheric pressure) of about 0.2-0.5 cc/g (more preferably about 0.25-0.35 cc/g), and a BET/$N_2$ surface area of about 25-150 $m^2/g$ (more preferably about 80-100 $m^2/g$).

In step (a), the zirconia powder is mixed with either an aqueous colloidal solution of zirconia, preferably containing about 10-30 weight-% of colloidal zirconia particles having a particle size of about 5-1000 (preferably about 5-200) nanometers, or alternatively, an aqueous mineral or carboxylic acid solution. Aqueous colloidal zirconia solutions are generally stabilized with acetic acid (preferred) or nitric acid and are commercially available (e.g., from PQ Corporation, Ashland, Mass., under the product designation of Nyacol®). Non-limiting examples of suitable acids are $H_2SO_4$, $HNO_3$, HCl, $HCO_3H$, $CH_3CO_2H$, $C_2H_5CO_2H$, and higher carboxylic acids containing one or two carboxyl groups per molecule. Presently preferred are aqueous solution containing $H_2SO_4$ or acetic acid, at a concentration of about 0.1 to 1.5 mol/l of the acid. Generally, the weight ratio of the colloidal zirconia solution or, alternatively, the aqueous acid solution to the zirconia powder is in the range of about 0.4:1 to about 1.5:1. Step (a) can be carried out in any suitable mixing device for a time period sufficient to provide a substantially homogeneous mixture, generally for at least 1 minute (preferably about 5-20 minutes).

Step (a) is carried out so as to provide a shapable mixture containing about 5-40 (preferably about 8-30, more preferably about 8-15) weight-% $H_2O$. It is within the scope of this invention to carry out step (a) essentially in one step by adding enough water (either as part of the colloidal solution of zirconia or the aqueous acid solution, or in addition to these solutions) to provide the required water content. However, it is preferred to carry out step (a) as a series of substeps: (a1) mixing powdered zirconia with an aqueous colloidal solution of zirconia or, alternatively, an aqueous solution of acetic or sulfuric acid, as described above; (a2) substantially drying the obtained wet mixture (preferably at a temperature of about 60°-120° C.); (a3) grinding the substantially dried mixture in any suitable grinder; (a4) sieving the ground, substantially dried particles and selecting a portion having a particle size of about 30-325 mesh, and (a5) mixing enough water with the particles obtained in step (a4) (in any suitable mixing device) to provide a shapable mixture containing about 5-40 (preferably about 8-30, more preferably about 8-15) weight-% water.

Shaping step (b) can be carried out in any conventional shaping equipment, such as an extruder equipped with a suitable die plate (through which the shapable mixture is extruded) or a tabletting machine (wherein the paste is compacted under pressure) or a pelletizer (wherein the paste is agglomerized to ball-shaped particles). The particles obtained in step (b) can have a cylindrical or a spherical or a trilobal or any other suitable shape. Presently preferred are cylindrical particles which can have any suitable size (preferably a diameter of about 1/16-¼ inch and a height of about 1/16-¼ inch). One preferred is a tabletting operation. The preferred processing aid which is present in the zirconia mixture during the tabletting process is zinc stearate (generally present in the zirconia mixture at a weight percentage of about 1-10 weight-%). When the shapable mixture is extruded, a cellulose gel and aqueous acetic acid are generally present in the mixture (generally at a level of about 0.5-5 weight-% cellulose and about 0.5-5 weight-% $CH_3CO_2H$).

Heating step (c) can be carried out in any suitable manner. Generally, the shaped particles are first substantially dried (preferably in air at a temperature of about 100°-280° C. for a time period of about 0.5-3 hours), and then calcined, preferably in air at a temperature of about 300°-750° C. for a time period of about 1-5 hours.

The finished zirconia particles (preferably having a cylindrical shape, a diameter of about 1/16-¼ inch and a height of about 1/16-¼ inch) preferably have a surface area (measured by the BET/$N_2$ method) of about 10-120 $m^2/g$, a pore volume (measured by water intrusion at atmospheric pressure) of about 0.2-0.4 cc/g (more preferably about 0.25-0.35 cc/g), and an average crush strength (measured in accordance with ASTM method D4179-82, entitled "Standard Test Method for Single Pellet Crush Strength of Formed Catalyst Shapes") of about 5-30 lb. (more preferably about 20-25 lb.) per particle.

The following examples are presented to further illustrate this invention and are not to be construed as unduly limiting its scope.

EXAMPLE I

This example illustrates the preparation of high strength zirconia tablets.

In one test, 200 grams of RC-100 zirconia powder, marketed by Zirconia Sales of America, Atlanta, Ga., having a particle size of about 1.0 micron, a BET/$N_2$ surface area of about 94 $m^2/g$ and a pore volume of about 0.3 cc $H_2O$ per gram, was mixed in a Sigma mixer with about 140 mL of a Nyacol® colloidal zirconia solution in water (containing about 20 weight-% of colloidal zirconia particles and about 1.5 mole acetic acid per mole zirconia, marketed by PQ Corporation, Ashland, Mass.). The Nyacol® colloidal zirconia solution was added in small aliquots over a time period of about 10 minutes with stirring. The mixture was then dried in a circulating air oven at 200° C., ground and sieved.

To the portion of particles which were smaller than 30 mesh was added enough water to attain a water content of 11.04 weight-%. 4 grams of zinc stearate was also added. This mixture was tabletted in a Stokes BB2 tabletting machine using ⅛" punches and ⅛" dies and employing 180 lb pressure. The tablets were dried in air for 1 hour at 250° C. in a furnace. Then the temperature of the furnace was increased to 550° C. over a period of 3 hours, and the dried particles were heated for 3 hours at 550° C. The average crush strength of about 50 tested calcined tablets (measured in a crush strength apparatus equipped with two metal plates of ⅛ inch diameter and a 0-30 lb. force gauge) was 19 lb. The calcined tablets had a water intrusion pore volume of 0.27 cc/g, a BET/$N_2$ surface area of 64 $m^2/g$, and a packed bulk density of 1.47 g/cc.

In a second test, calcined zirconia particles were prepared substantially in accordance with the procedure of the first test, except that 140 mL aqueous sulfuric acid (containing 2 volume-% $H_2SO_4$) was employed (in lieu of 140 mL of the colloidal Nyacol® solution). Calcined zirconia particles had an average crush strength of 22 lb. per particle, a water intrusion pore volume of 0.26 cc/g, a BET/$N_2$ surface area of 91 $m^2/g$ and a packed bulk density of 1.43 g/cc.

A more detailed porosity analysis of the calcined zirconia tablets by means of the mercury intrusion method, employing a Micromeritics (Norcross, Ga.) Autopore Hg PSD apparatus at a pressure ranging from 10 to 60,000 psi, revealed the following pore volume distribution (in cc/g):

|  | First Test | Second Test |
| --- | --- | --- |
| total pore volume | 0.26 | 0.23 |
| volume of pores < 50 Å radius | 0.08 | 0.14 |
| volume of pores 50-300 Å radius | 0.16 | 0.08 |
| volume of pores > 300 Å radius | 0.02 | 0.01 |

EXAMPLE II

This example illustrates the preparation of zirconia particles by extrusion, in accordance with this invention.

100 grams of RC-100 zirconia powder (described in Example I), 2 grams of Avicel® (a microcrystalline cellulose gel, provided by FMC Corporation, Philadelphia, Pa.) and 20 mL of an aqueous, 2 volume-% acetic acid solution were mixed in a Sigma mixer for 10 minutes. Thereafter, an additional volume of 30 mL of the 2 volume-% acetic acid solution was added in small increments to give the paste the consistency required for successful extrusion. The paste was extruded using an air-driven Bonnot laboratory extruder equipped with a copper die plate having four ⅛" diameter holes and ¼" spacing between the die plate and the extruder barrel. The extrudates were dried overnight at about 200° C. in air. Thereafter, the particles were calcined as described in Example I.

The extrudates had an average crush strength of 6 lb. per particle, a water intrusion pore volume of 0.34 cc/g, a BET/$N_2$ surface area of 60 $m^2/g$. Mercury intrusion pore volume analysis of the calcined zirconia extrudates revealed:

| total pore volume: | 0.32 cc/g |
| --- | --- |
| volume of pores < 50 Å radius | 0.02 cc/g |
| volume of pores 50-300 Å radius | 0.22 cc/g |
| volume of pores > 300 Å radius | 0.08 cc/g. |

The above test data show that the extrudates obtained in this example had a lower crush strength than the tablets prepared by the procedure of Example I, but the total pore volume of the extrudates was higher than that of the tablets described in Example I. A significant fraction of the pore volume of the extrudates was the volume of >300Å pores (desirable for many catalytic reactions).

Reasonable variations, modifications and adaptations can be made within the scope of the disclosure and the appended claims without departing from the scope of this invention.

That which is claimed is:

1. A process for preparing extruded zirconia particles consisting essentially of the steps of (a) preparing a mixture comprising zirconia powder and an aqueous acid solution, and adjusting the water content of the obtained mixture to a level of about 5 to about 40 weight % $H_2O$; (b) extruding the mixture obtained in step (a); (c1) substantially drying the extruded particles obtained in step (b); and (c2) calcining the substantially dried, extruded particles obtained in step (c1) at a temperature of about 300°–750° C.

2. A process in accordance with claim 1, wherein the zirconia powder employed in step (a) has a pore volume of about 0.2–0.5 cc/g, a surface area of about 20–150 m²/g and a particle size of about 0.1–5 microns.

3. A process in accordance with claim 2, wherein step (a) is carried out with an aqueous acid solution containing at least one acid selected from the group consisting of $H_2SO_4$, $HNO_3$, HCl, $HCO_2H$, $CH_3CO_2H$ and $C_2H_5CO_2H$.

4. A process in accordance with claim 3, wherein said aqueous acid solution contains at least one acid is selected from the group consisting of sulfuric acid and acetic acid at an acid concentration of about 0.1–1.5 mole/l.

5. A process in accordance with claim 3, wherein the weight ratio of said aqueous acid solution to said zirconia powder is in the range of about 0.4:1 to about 1.5:1.

6. A process in accordance with claim 1, wherein the extruded zirconia particles obtained in step (c2) have a surface area of about 10–120 m²/g, a pore volume of about 0.2–0.4 cc/g and a crush strength of about 5–30 lb./particle.

7. A process in accordance with claim 1, wherein the water content attained in step (a) is about 8–30 weight-% $H_2O$, and step (c2) is carried out for about 1–5 hours.

8. A process in accordance with claim 7, wherein the mixture obtained in step (a) comprises about 0.5–5 weight-% acetic acid and additionally about 0.5–5 weight-% cellulose gel.

9. A process for preparing extruded zirconia particles consisting essentially of the steps of (a) preparing a mixture comprising zirconia powder and an aqueous colloidal solution of zirconia, and adjusting the water content of the obtained mixture to a level of about 5 to about 40 weight-% $H_2O$; (b) extruding the mixture obtained in step (a); (c1) substantially drying the extruded particles obtained in step (b); and (c2) calcining the substantially dried, extruded particles obtained in step (c1) at a temperature of about 300°–750° C.

10. A process in accordance with claim 9, wherein the zirconia powder employed in step (a) has a pore volume of about 0.2–0.5 cc/g, a surface area of about 20–150 m²/g and a particle size of about 0.1–5 microns.

11. A process in accordance with claim 10, wherein step (a) is carried out with an aqueous colloidal solution of zirconia containing about 10–30 weight-% colloidal zirconia particles having a particle size of about 5–1,000 nanometers.

12. A process in accordance with claim 11, wherein said aqueous colloidal solution of zirconia is stabilized with acetic acid or, alternatively, nitric acid.

13. A process in accordance with claim 12, wherein the weight ratio of said aqueous colloidal solution of zirconia to said zirconia powder is in the range of about 0.4:1 to about 1.5:1.

14. A process in accordance with claim 9, wherein the water content attained in step (a) is about 8–30 weight-% $H_2O$, and step (c2) is carried out for about 1–5 hours.

15. A process in accordance with claim 9, wherein the extruded zirconia particles obtained in step (c2) have a surface area of about 10–120 m²/g, a pore volume of about 0.2–0.4 cc/g and a crush strength of about 5–30 lb./particle.

16. A process for preparing shaped zirconia particles consisting essentially of the steps of:

(a1) preparing a mixture comprising zirconia powder and an aqueous acid solution;

(a2) substantially drying the mixture obtained in step (a1);

(a3) grinding the substantially dried mixture obtained in step (a2);

(a4) sieving the ground mixture obtained in step (a3) and selecting a portion having a particle size of about 30–325 mesh;

(a5) mixing water with the particles obtained in step (a4) so as to attain a water content of about 8–30 weight-% $H_2O$ in the thus-obtained mixture;

(b) shaping the mixture obtained in step (a5) by tabletting or, alternatively, pelletizing;

(c1) substantially drying the shaped particles obtained in step (b); and (c2) calcining the substantially dried, shaped particles obtained in step (c1) at a temperature of about 300°–750° C.

17. A process in accordance with claim 16, wherein the zirconia powder employed in step (a1) has a pore volume of about 0.2–0.5 cc/g, a surface area of about 20–150 m²/g and a particle size of about 0.1–5 microns.

18. A process in accordance with claim 17, wherein step (a1) is carried out with an aqueous acid solution containing at least one acid selected from the group consisting of $H_2SO_4$, $HNO_3$, HCl, $HCO_2H$, $CH_3CO_2H$ and $C_2H_5CO_2H$.

19. A process in accordance with claim 17, wherein said aqueous acid solution contains at least one acid selected from the group consisting of sulfuric acid and acetic acid and has an acid concentration of about 0.1–1.5 mole/l.

20. A process in accordance with claim 19, wherein the weight ratio of said aqueous acid solution to said zirconia powder is in the range of about 0.4:1 to about 1.5:1.

21. A process in accordance with claim 16, wherein shaping step (b) is tabletting.

22. A process in accordance with claim 21, wherein shaping step (b) is carried out in the presence of about 1–10 weight-% zinc stearate in said mixture.

23. A process in accordance with claim 21, wherein the water content attained in step (a) is about 8–15 weight-% $H_2O$, and step (c2) is carried out for about 1–5 hours.

24. A process in accordance with claim 16, wherein the shaped zirconia particles obtained in step (c2) have a surface area of about 10–120 m²/g, a pore volume of about 0.2–0.4 cc/g and a crush strength of about 5–30 lb./particle.

25. A process for preparing shaped zirconia particles consisting essentially of the step of (a1) preparing a mixture comprising zirconia powder and an aqueous colloidal solution of zirconia;

(a2) substantially drying the mixture obtained in step (a1);

(a3) grinding the substantially dried mixture obtained in step (a2);

(a4) sieving the ground mixture obtained in step (a3) and selecting a portion having a particle size of about 30–325 mesh;

(a5) mixing water with the particles obtained in step (a4) so as to attain a water content of about 8–30 weight-% $H_2O$ in the thus-obtained mixture;

(b) shaping the mixture obtained in step (a5) by tabletting or, alternatively, pelletizing;

(c1) substantially drying the shaped particles obtained in step (b); and (c2) calcining the substantially dried, shaped particles obtained in step (c1) at a temperature of about 300°–750° C.

26. A process in accordance with claim 25, wherein the zirconia powder employed in step (a1) has a pore volume of about 0.2–0.5 cc/g, a surface area of about 20–150 m$^2$/g and a particle size of about 0.1–5 microns.

27. A process in accordance with claim 26, wherein step (a1) is carried out with an aqueous colloidal solution of zirconia containing about 10–30 weight-% colloidal zirconia particles having a particle size of about 5–1,000 nanometers.

28. A process in accordance with claim 27, wherein said aqueous colloidal solution of zirconia is stabilized with acetic acid or, alternatively, nitric acid.

29. A process in accordance with claim 27, wherein the weight ratio of said aqueous colloidal solution of zirconia to said zirconia powder is in the range of about 0.4:1 to about 1.5:1.

30. A process in accordance with claim 25, wherein shaping step (b) is tabletting.

31. A process in accordance with claim 30, wherein shaping step (b) is carried out in the presence of about 1–10 weight-% zinc stearate in said mixture.

32. A process in accordance with claim 30, wherein the water content attained in step (a) is about 8–15 weight-% H$_2$O, and step (c2) is carried out for about 1–5 hours.

33. A process in accordance with claim 25, wherein the shaped zirconia particles obtained in step (c2) have a surface area of about 10–120 m$^2$/g, a pore volume of about 0.2–0.4 cc/g and a crush strength of about 5–30 lb./particle.

* * * * *